US010663023B2

(12) United States Patent
Zandbergen et al.

(10) Patent No.: US 10,663,023 B2
(45) Date of Patent: May 26, 2020

(54) HYBRID LIGHTWEIGHT BRAKE DISK AND PRODUCTION METHOD

(71) Applicant: Ford Global Technologies, LLC, Dearborn, MI (US)

(72) Inventors: Paul Zandbergen, Würselen (DE); Maik Broda, Würselen (DE); Raphael Koch, Odenthal (DE); Clemens Verpoort, Monheim am Rhein (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/876,631

(22) Filed: Jan. 22, 2018

(65) Prior Publication Data

US 2018/0209498 A1   Jul. 26, 2018

(30) Foreign Application Priority Data

Jan. 20, 2017   (DE) .......................... 10 2017 200 945

(51) Int. Cl.
*B23K 26/342* (2014.01)
*F16D 65/12* (2006.01)
(Continued)

(52) U.S. Cl.
CPC .......... *F16D 65/125* (2013.01); *B22F 3/1055* (2013.01); *B22F 7/062* (2013.01);
(Continued)

(58) Field of Classification Search
CPC ...... F16D 65/12; F16D 65/123; F16D 65/125; F16D 65/127; F16D 65/128; F16D 65/84;
(Continued)

(56) References Cited

U.S. PATENT DOCUMENTS 5,612,110 A * 3/1997 Watremez ............. F16D 65/123
188/251 R
8,721,954 B2 * 5/2014 La Forest ............... B29C 70/48
264/259
(Continued)

FOREIGN PATENT DOCUMENTS

CN   103939509   7/2014
CN   104235237   12/2014
(Continued)

OTHER PUBLICATIONS

Krug, Peter, Spruhkompaktierte Aluminiumlegierungen-ungewohnliche Werkstoffe fur anspruchsvolle Leichtbaukonzepte. In: Schmiede-Journal, 2008, S. 34-36, ISSN 0933-8330.

*Primary Examiner* — Thomas W Irvin

(74) *Attorney, Agent, or Firm* — Burris Law, PLLC

(57) ABSTRACT

The present disclosure relates to a hybrid lightweight brake disk and a method for producing the hybrid lightweight brake disk. The hybrid lightweight brake disk includes a brake chamber and a friction ring with at least one circular, outer friction surface. The method provides a brake chamber that includes a material containing an aluminum-forged alloy and a friction ring having a rapidly solidified aluminum alloy built up on an edge region of the brake chamber by using a laser deposition welding process or a 3D-printing process.

9 Claims, 4 Drawing Sheets

(51) Int. Cl.
*F16D 65/84* (2006.01)
*B33Y 80/00* (2015.01)
*B22F 7/06* (2006.01)
*B22F 3/105* (2006.01)
*B33Y 10/00* (2015.01)
*B23P 15/18* (2006.01)
*B23K 26/00* (2014.01)
*F16D 65/02* (2006.01)
*B22F 3/24* (2006.01)
*B23K 103/10* (2006.01)

(52) U.S. Cl.
CPC ........ *B23K 26/0006* (2013.01); *B23K 26/342* (2015.10); *B23P 15/18* (2013.01); *B33Y 10/00* (2014.12); *B33Y 80/00* (2014.12); *F16D 65/12* (2013.01); *F16D 65/123* (2013.01); *F16D 65/127* (2013.01); *F16D 65/128* (2013.01); *F16D 65/84* (2013.01); *B22F 2003/247* (2013.01); *B22F 2207/11* (2013.01); *B22F 2998/10* (2013.01); *B22F 2999/00* (2013.01); *B23K 2103/10* (2018.08); *F16D 2065/1316* (2013.01); *F16D 2065/1324* (2013.01); *F16D 2065/1332* (2013.01); *F16D 2200/003* (2013.01); *F16D 2200/0047* (2013.01); *F16D 2250/00* (2013.01); *F16D 2250/0076* (2013.01); *Y02P 10/295* (2015.11)

(58) Field of Classification Search
CPC ................................................. F16D 2065/132; F16D 69/027; B23K 26/342
See application file for complete search history.

(56) References Cited

U.S. PATENT DOCUMENTS

| | | | |
|---|---|---|---|
| 9,144,940 B2 | 9/2015 | Martin | |
| 9,481,067 B2 * | 11/2016 | Flores | F16D 65/12 |
| 9,776,282 B2 * | 10/2017 | Subramanian | B22F 3/1055 |
| 9,829,057 B2 * | 11/2017 | Chung | F16D 65/127 |
| 9,933,031 B2 * | 4/2018 | Bracamonte | B32B 15/01 |
| 10,151,363 B2 * | 12/2018 | Bracamonte | B32B 15/01 |
| 2002/0157321 A1 * | 10/2002 | Chiba | F16D 69/026 51/307 |
| 2011/0315668 A1 * | 12/2011 | Olsen | B22F 5/12 219/146.23 |
| 2012/0104641 A1 * | 5/2012 | La Forest | B29C 70/48 264/29.5 |
| 2016/0144451 A1 * | 5/2016 | Fujimoto | B23K 11/16 219/92 |
| 2016/0223041 A1 * | 8/2016 | Saga | B61H 5/00 |
| 2016/0263833 A1 * | 9/2016 | Vittitow | B22F 3/1055 |
| 2016/0290423 A1 * | 10/2016 | Tironi | F16D 65/12 |
| 2016/0369857 A1 * | 12/2016 | Chung | F16D 65/127 |
| 2017/0050241 A1 * | 2/2017 | Thomas | E21B 10/42 |
| 2017/0175834 A1 * | 6/2017 | Bracamonte | B32B 15/01 |
| 2018/0093414 A1 * | 4/2018 | Martino | C22C 32/00 |
| 2018/0142746 A1 * | 5/2018 | Hodgkins | B22F 3/1055 |
| 2018/0180125 A1 * | 6/2018 | Hollis | F16D 65/127 |
| 2019/0024738 A1 * | 1/2019 | Bracamonte | B32B 15/01 |

FOREIGN PATENT DOCUMENTS

| | | | | |
|---|---|---|---|---|
| CN | 104404508 | | 3/2015 | |
| DE | 102010025815 | | 1/2012 | |
| DE | 102010037123 | | 2/2012 | |
| DE | 102011120969 | | 6/2013 | |
| DE | 102016105162 A1 * | 9/2017 | ........... B23K 26/342 |
| EP | 0833698 | | 8/2002 | |
| KR | 101587411 | | 1/2016 | |
| WO | 2016/174426 | | 11/2016 | |
| WO | 2016/177895 | | 11/2016 | |

\* cited by examiner

HYBRID LIGHTWEIGHT BRAKE DISK AND PRODUCTION METHOD

CROSS-REFERENCE TO RELATED APPLICATIONS

This application claims priority to and the benefit of DE 102017200945.4 filed on Jan. 20, 2017. The disclosure of the above application is incorporated herein by reference.

FIELD

The present disclosure relates to a method for producing hybrid lightweight brake disks and to a hybrid lightweight brake disk.

BACKGROUND

The statements in this section merely provide background information related to the present disclosure and may not constitute prior art.

Conventional brake disks are primarily produced from gray cast iron (GG15, GG25) or nodular cast iron (cast iron with globular graphite: GGG60, GGG70) and machined in a cutting process by means of turning. Proposals to replace the heavy gray cast iron material with aluminum are known from the prior art. On account of the low density of aluminum, the weight of the brake disk can consequently be reduced by approximately 50%. Such a brake disk, however, has significant disadvantages. On the one hand, aluminum alloys, in contrast to gray cast iron material, do not have the necessary abrasion resistance, also the melting point of aluminum-cast iron alloys lies below 650° C. When performing brake tests, such as the so-called AMS (Automotor and Sport) test, however, during repeated braking maneuvers from a speed of 115 km/h to 0 km/h temperatures of above 750° C. were measured on the gray cast iron brake disk. On the other hand, aluminum alloys have a many-times higher heat conductivity compared with gray cast iron material and can therefore dissipate resulting friction heat more quickly to the ambient air.

Known as a possible solution in the prior art are aluminum alloys the melting point of which is increased on account of a high silicon content (so-called hypereutectic aluminum-silicon alloys). At the same time the increased silicon content in this case leads to an increased abrasion resistance.

Also described in the prior art is the use of aluminum materials which are produced by spray compaction of molten metals, wherein during a subsequent manufacture of a component by extrusion the improved mechanical and thermal properties are maintained (Peter Krug: "*Spray compacted aluminum alloys—uncommon materials for demanding lightweight concepts*", Forging Journal September 2008, p. 34-36).

These aluminum materials (for example the commercially available DISPAL®-aluminum materials) are produced by means of the powder metallurgical process of spray compacting and have a content of up to 35% silicon. By the addition or silicon carbide in the powder metallurgical process the abrasion resistance can be further increased. Brake disks made from aluminum with reinforcing particles consisting of silicon carbide (Duralcan®) have already been used as cast aluminum brake disks. However, these disks have not been able to be established in the market on account of issues in the castability and high aftermachining costs.

Another approach, in which conventional aluminum-silicon brake disks are protected against abrasive wear by a coating consisting of hard metal (e.g. tungsten carbide-cobalt WC-Co), leads to high costs on account of the use of strategically vital tungsten carbide and the diamond tools which are required for an aftermachining.

Also described in the prior art are hybrid brake disks in which the so-called chamber consists of an aluminum-forged alloy or aluminum alloy and an abrasion-loaded friction surface of the brake disk consists of a cast gray cast iron material.

An example of another hybrid brake disk is known from CN 103939509 A. This patent application describes a friction pair consisting of an Al/SiC (aluminum/silicon carbide) and Cu/SiC (copper/silicon carbide) composite material for use for rail vehicles, and a production method for the Al/SiC-Cu/SiC friction pair. A compound which is formed from a silicon carbide-ceramic structure is embedded in the friction surface of the friction pair. A multiplicity of heat-dissipating ribs are arranged on the other side of the friction pair in a circumferential direction. Formed in the middle of each of the heat-dissipating ribs is a ventilation passage which extends through the brake disk. The silicon carbide-ceramic structure is embedded in the friction surface of a Cu/SiC brake lining. Grid-like, heat-dissipating cooling ribs are arranged on the other side of the Cu/SiC brake lining.

The method for producing the Al/SiC-Cu/SiC composite material friction pair comprises steps for producing the compound formed by the silicon carbide-ceramic structure, a pretreatment of the silicon carbide-ceramic structure, construction and production of a brake disk and a brake lining casting mold, casting of the brake disk and the brake lining at low pressure, carrying out a heat treatment of the brake disk and the brake lining, precision machining of the brake disk and the brake lining and storing of the finished product. In this case, the Al/SiC-Cu/SiC composite material friction pair is intended to be able to be easily produced, to have a low weight and high and stable friction coefficient, to have good heat conducting properties and a long service life and is intended to be suitable for existing rail vehicles.

Described in CN 104235237 A is a road vehicle brake disk made from a composite material built up from carborundum (silicon carbide)-foamed ceramic and aluminum alloys and a method for producing the road vehicle brake disk. The body of the reinforced aluminum alloy brake disk with a carborundum-foamed ceramic structure is produced from reinforced aluminum alloy materials such as an aluminum alloy or nano-ceramic particles or carbon nano-tubules. The carborundum-foamed ceramic structure is cast onto two symmetrical friction surfaces of the brake disk. Grooves for heat dissipation or axial holes can be formed on the friction surfaces.

A multiplicity of heat-dissipating cooling ribs are cast in the circumferential direction of the non-friction surfaces. Fastening holes are formed in the disk body. The production method includes steps for producing the carborundum-foamed ceramic structure, premachining of the ceramic structure, construction and production of a casting mold of the brake disk, low pressure casting of the brake disk, heat treatment of the brake disk, precision machining of the brake disk, and storing of the finished product.

For producing hybrid brake disks, the use of additive production methods such as 3D and laser deposition welding also come into consideration.

By means of 3-D printing, plastics, synthetic resins, ceramics and metals can be used as materials. For example, U.S. Pat. No. 9,144,940 B2 describes a method for printing a three-dimensional part and a support structure using an additive production system based on electrophotography.

The method includes forming a backing layer of the support structure from a soluble auxiliary material, which contains a first and a second copolymer, using a first electrophotographic machine, and transferring the formed backing layer from the first electrophotographic machine onto a transfer medium.

Furthermore, CN 104404508 A describes a laser-based additive production method for producing a structural part from an aluminum alloy. The laser-based additive production method is characterized in that an autonomous argon protective device is positioned on a work table, a base material consisting of aluminum alloy is positioned in the autonomous argon protective device, ultra-pure argon gas is injected beforehand, wherein the oxygen content in the cavity is less than 70 μl/l, and a customized powder feed device is used to order to feed in aluminum, an iron-based alloy, the rare earth material $La_2O_3$ and other superfine metal powders which are uniformly mixed according to a specified mass ratio by the use of laser beams in a melting bath in order to thereby form a laser beam coating which is subjected to a metallurgical bonding with the base material. The numerically controlled working program then carries out the laser beam coating layer by layer for all the layers until finally a three-dimensional metal part has been produced. In this way, the high-performance, completely compact aluminum alloy structural part with a rapid solidification structure and a complex geometry can be produced. According to the description, the laser-based additive production method has low production costs, short production times, a high material usage and a stable performance and can quickly produce complicated components, significantly improve the strength properties of the aluminum alloy structural part and reduce structural defects, such as gas pores, cracks, residual stress, etc., in the alloy.

Korean Patent KR 101587411 B1 describes a heat treatment device for a 3D-metal printer and a method relating to this for the heat treatment of a structure. The heat treatment device comprises a 3D-metal printer, which stacks and processes a structure by the melting of metal powder by means of a laser, a main control part for controlling an operation of the 3D-metal printer and a heat treatment unit. The heat treatment unit carries out a heat treatment of each layer during the stacking. The heat treatment device therefore carries out a heat treatment of the structure and of its interior, which is required during the process of stacking and processing of the structure with the 3D-metal printer, by performing heat treatments on even layers.

Described in EP 0 833 698 B1 is a method for producing ceramic-metal structures in which is particularly provided a solution for producing a structure consisting of a non-wetting, liquefiable material, for example a liquefied metal such as aluminum, copper, magnesium, etc., on a solid substrate which is not wettable by the material.

Described in one embodiment is a method for producing a ceramic-metal band which for example can be used for lightweight automobile brakes. The method comprises the following steps:

depositing a layer of a non-wettable ceramic powder on a formed solid mold;

depositing a layer of a wettable powder on the layer of the non-wetting ceramic powder;

bringing a metal into contact with the layer of the wettable powder;

heating the metal to a temperature at which the metal exerts a capillary action between the particles of the layer of wettable powder and comes into contact with the layer of the non-wettable ceramic powder in order to form a metal-penetrated structure; and cooling the metal-penetrated structure in order to solidify the metal and to form a ceramic-metal band on the solid mold.

On the evidence of the featured prior art, the field of hybrid brake disks offers more room for improvements with regard to temperature loadability, abrasion resistance, lower complexity of production, and design freedom.

SUMMARY

The present disclosure provides a brake disk with adequate temperature loadability and sufficient abrasion resistance, and a method for its production which manages without a subsequent thermal spray coating.

The present disclosure provides a method for producing a hybrid lightweight brake disk having the features of claim 1, wherein the hybrid lightweight brake disk has a brake chamber and a friction ring. The present disclosure also provides a hybrid lightweight brake disk having a brake chamber and a friction ring with at least one circular, outer friction surface.

Reference is to be made to the fact that the features and measures which are quoted individually in the following description can be combined with each other in any, technically practical way and demonstrate further forms of the present disclosure. The description characterizes and specifies the present disclosure particularly in conjunction with the figures.

A method according to the present disclosure for producing a hybrid lightweight brake disk comprises the following steps:

providing a brake chamber from a material which features an aluminum-forged alloy; and building up a friction ring from a rapidly solidified aluminum alloy on an edge region of the brake chamber by using additive production such as a laser deposition welding process or a 3D-printing process.

In addition to aluminum, the aluminum-forged alloy in one form contains proportions of at least one metal, and in another form, contains proportions of at least two metals, which are selected from a group which consists of magnesium, silicon, copper and manganese. These aluminum-forged alloys have good heat conductivity and high ductility.

Especially a solidification with a cooling speed which lies several, in one form at least three and in another form at least five, orders of magnitude (i.e. a factor of $10^5$) above a cooling speed of typical casting processes, is to be understood by the term "rapidly solidified" within the scope of the present disclosure. For producing rapidly solidified aluminum alloys, laser beam sources and electron beam guns can especially be used.

Rapidly solidified aluminum alloys are therefore not able to be produced by means of conventional fusion and casting metallurgy and can have properties which are vastly superior to those of conventionally produced aluminum alloys.

In this way, a method for producing a hybrid brake disk of lightweight design with adequate temperature loadability and sufficient abrasion resistance can be provided and manages without a subsequent thermal spray coating.

If the building up of the friction ring is carried out by using a 3D-printing process, an identification of the friction ring, for example a part number, can advantageously be introduced during the building up.

The rapidly solidified aluminum alloy can differ in its composition from the aluminum-forged alloy. In particular, the rapidly solidified aluminum alloy, in addition to aluminum, can also feature proportions of at least one metal, and in one form at least two metals, which are selected from a group which consists of silicon, magnesium, chromium, iron, cobalt, copper, manganese, nickel and titanium. The rapidly solidified aluminum alloy can also be provided in a form which is adapted to the applied method for building up the friction ring.

The provided brake chamber can in one form have an oversize compared with a finished machined state. As a result, a precise production geometry of the brake chamber can be achieved with little labor expenditure. The provided brake chamber can in one form be produced by a metal removal production process, for example by machining, such as turning.

In an advantageous form of the method, the step of building up the friction ring includes a deposition of the rapidly solidified aluminum alloy from a powder. During the fusion metallurgical building up of the friction ring by using a laser deposition welding process or a 3D-printing process, the rapidly solidified aluminum alloy in powder form maintains its favorable mechanical properties. In this way, for example a high level of thermal stability and a high level of abrasion resistance of the friction ring can be achieved so that an after-coating of the friction ring can be dispensed with.

If the step of building up the friction ring comprises a directed deposition of the rapidly solidified aluminum alloy in a direction which with a perpendicular direction of the brake chamber forms an angle which differs from zero, a lower thermal power density at the location of the building up can be achieved as a result of an enlarged weld joint zone during said building up of the friction ring and dissipation of heat from a fusion zone with a reduced temperature difference can be achieved. Consequently, the effect of the favorable mechanical properties of the rapidly solidified aluminum alloy being lost can be avoided and/or the step of building up the friction ring can be performed in shorter time.

The direction of the directed deposition, in one form, forms with the perpendicular direction of the brake chamber an angle of between 10° and 20° and in another form an angle of between 20° and 30°.

A loss of the favorable mechanical properties of the rapidly solidified aluminum alloy as a result of excessively long cooling times during the building up of the friction ring can also be counteracted if the method additionally includes a step of forced cooling of the brake chamber during the building up of the friction ring.

In one form, and especially effectively, the forced cooling of the brake chamber can be carried out on a cylindrical part of the brake chamber.

In another form, the method can feature a preparatory step of diamond rolling of at least one part of the edge region of the brake chamber, as a result of which its surface is microscopically enlarged and a mechanical bonding of the friction ring, which is to be built up, to the edge regions of the brake chamber can be improved.

In yet another form of the method, the rapidly solidified aluminum alloy contains an additive of silicon carbide. In this way, a particularly high level of abrasion resistance of the friction ring can be achieved.

The additive of silicon carbide in the rapidly solidified aluminum alloy, in one variation, exists in the form of nano-particles.

In another form of the method, in which the building up of the friction ring is carried out by using a 3D-printing process, a metal matrix composite material, which comprises the rapidly solidified aluminum alloy, is used as the aluminum alloy which is to be built up. As a result, a particularly simple implementation of the 3D-printing process can be enabled.

In a further form, the method features an additional step of the aftermachining of the built up hybrid lightweight brake disk by machining the brake chamber and omitting a machining of the friction ring. When using the method according to the present disclosure, a surface roughness of the friction surface, which is suitable for stripping out material from a brake lining during the initial braking process and transferring it to the friction surface for forming a brake transfer film, can be established.

Proposed in a further aspect of the present disclosure is a hybrid lightweight brake disk which comprises a brake chamber and a friction ring with at least one circular, outer friction surface. The brake chamber is produced from a material which contains an aluminum-forged alloy. To be included with this is especially also the case in which the brake chamber comprises completely, i.e. 100%, of the aluminum forged-alloy. Also, the friction ring is fixedly connected to an edge region of the brake chamber and in a predominant proportion comprises a rapidly solidified aluminum alloy.

To be understood by the term "in a predominant proportion" in the sense of the present disclosure should be construed as a proportion of more than 50%, and in one form the portion is more than 70% and in another form the portion is more than 90%. In particular, the term is to include the possibility that the friction ring comprises completely, i.e. 100%, of the rapidly solidified aluminum alloy.

It is to be understood that the term "fixedly connected" in the sense of the present disclosure should be construed as both being connected by material bonding and being connected by non-positive engagement, for example being screw-fastened.

In this way, a hybrid brake disk of lightweight design with an adequate temperature loadability and sufficient abrasion resistance can be provided, the production of which manages without a subsequent thermal spray coating.

The hybrid lightweight brake disk can advantageously be produced by using the disclosed method according to the present disclosure, as a result of which the fixed connection of the friction ring to the edge region of the brake chamber is produced by material bonding. Alternatively, the friction ring can initially be produced by using a laser deposition welding process or a 3D-printing process. The friction ring can then be fixedly connected, for example screwed on, to the edge region of the brake chamber.

In one form of the hybrid lightweight brake disk as a double brake disk with two friction rings, a multiplicity of cooling passages are formed inside the friction ring, which cooling passages have in each case a first opening, facing an interior of the brake chamber, and a second opening, arranged on an outer circumferential line of the friction ring, and form a flow passage for ambient air. Consequently, an efficient level of air cooling can be achieved during operation of the hybrid lightweight brake disk.

In a further designed form of the hybrid lightweight brake disk, at least one cavity is arranged in an azimuthal direction between two adjacent cooling passages for further weight saving. The at least one cavity, by at least one through-opening, can be fluidically connected to at least one of the cooling passages, as a result of which production residues in the form of a non-melted powder can be removed. The at least one cavity, however, can also be hermetically sealed.

By using the disclosed method according to the present disclosure, a particularly low material cost and a particularly high degree of design freedom with regard to the multiplicity of cooling passages can be achieved during the production of such a hybrid lightweight brake disk.

The cooling passages of the multiplicity of cooling passages inside the friction ring are, in one form, fluidically connected. As a result of a design with a high number of cooling passages, which can be fluidically connected at one or more positions along the cooling passages, an inner surface of the friction ring, which is formed by side surfaces of the cooling passages and serves as a heat exchange surface, can be advantageously increased, as a result of which friction heat which develops can be quickly dissipated to the ambient air. As a result of the fluidic connection of cooling passages, for example by through-openings, a material usage for the production can also advantageously be saved and the weight of the hybrid lightweight brake disk reduced.

The design possibilities reach in this case from a multiplicity of cooling passages which are fluidically independent of each other to a multiplicity of cooling passages which are all fluidically connected so that arranged inside the friction ring are a multiplicity of spaced apart ribs by means of which two disk sections of the friction rings are connected so that the friction ring can be understood as being constructed in one piece from two friction ring sections.

By using a 3D-printing process, it is also made possible in a simple manner to construct sidewalls of the cooling passages in an irregular form and for example to equip them with a multiplicity of projections which protrude into the cooling passage. In this way, an increased effective heat exchange surface can be achieved. Furthermore, it is possible in this way to create fluidic conditions which at least locally can lead to turbulent flow and allow a more effective transporting away of heat.

In another advantageous form of the hybrid lightweight brake disk, the at least one circular, outer friction surface is equipped with a multiplicity of grooves. The arrangement of the grooves in the friction surface serves for the removal of brake dust and/or rain water from said friction surface.

A multiplicity of grooves and/or or axially arranged penetrations for increasing heat dissipation in the circular, outer friction surface can be realized by using the disclosed method according to the present disclosure with particularly low material cost.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
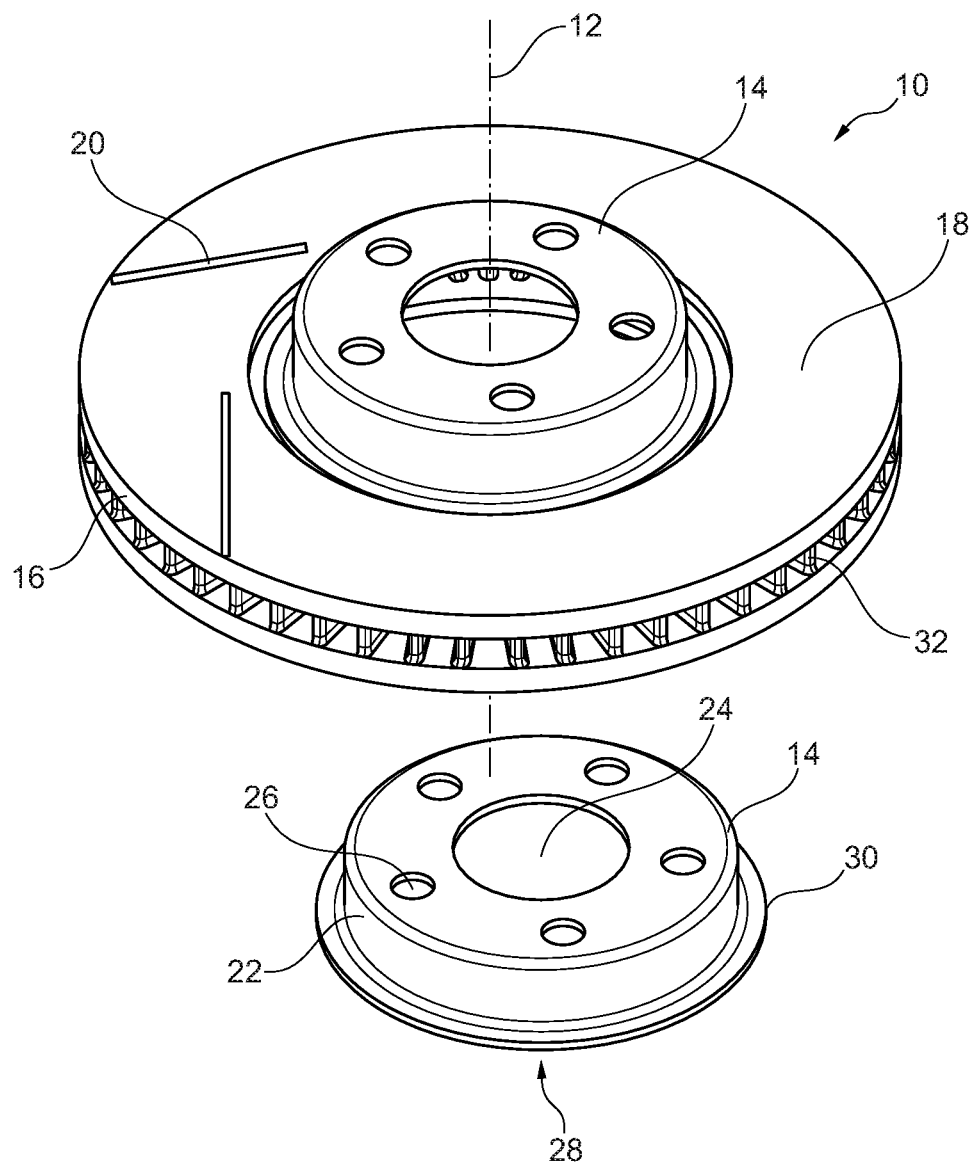
FIG. 1 shows a perspective view of a hybrid lightweight brake disk and a brake chamber of the hybrid lightweight brake disk according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a hybrid lightweight brake disk 10 according to the present disclosure and a brake chamber 14 of the hybrid lightweight brake disk 10 in a perspective plan view. The hybrid lightweight brake disk 10 is provided as a double disk brake for use in a vehicle designed as an automobile. A symmetry axis 12 of the hybrid lightweight brake disk 10 coincides with an axle of the vehicle in an installed state.

The brake chamber 14 basically has the shape of a cylinder which is open toward the bottom in the plane of the drawing. An upper, in the plane of the drawing, cover of the cylindrical part 22 has a central through-opening 24 for centering purposes and a plurality, for example five, fastening through-holes 26 for fastening on a vehicle axle. An edge region 28, which is arranged at the lower end of the cylindrical part 22, comprises an upper and a lower side of encompassing projection 30.

The brake chamber 14 is produced from a material of the aluminum-forged alloy with the exemplary material number EN AW-6061 (AlMg1SiCu). The brake chamber 14 is manufactured from the aluminum-forged alloy in a cutting process by turning and has an oversize, for example an oversize of 0.5 mm, compared with a finish-machined state.

The hybrid lightweight brake disk 10 also includes a friction ring 16 with a circular, outer friction surface 18 in each case. Only one friction surface 18 can be seen in the plane of the drawing. The friction ring 16 is fixedly connected to the edge region 28 of the brake chamber 14 and in a predominant proportion comprises a rapidly solidified aluminum alloy, for example AlSi20Fe5Ni2, which in composition corresponds to the exemplary material DISPAL® S250. Moreover, the rapidly solidified aluminum alloy comprises an additive of silicon carbide.

Figure 2:
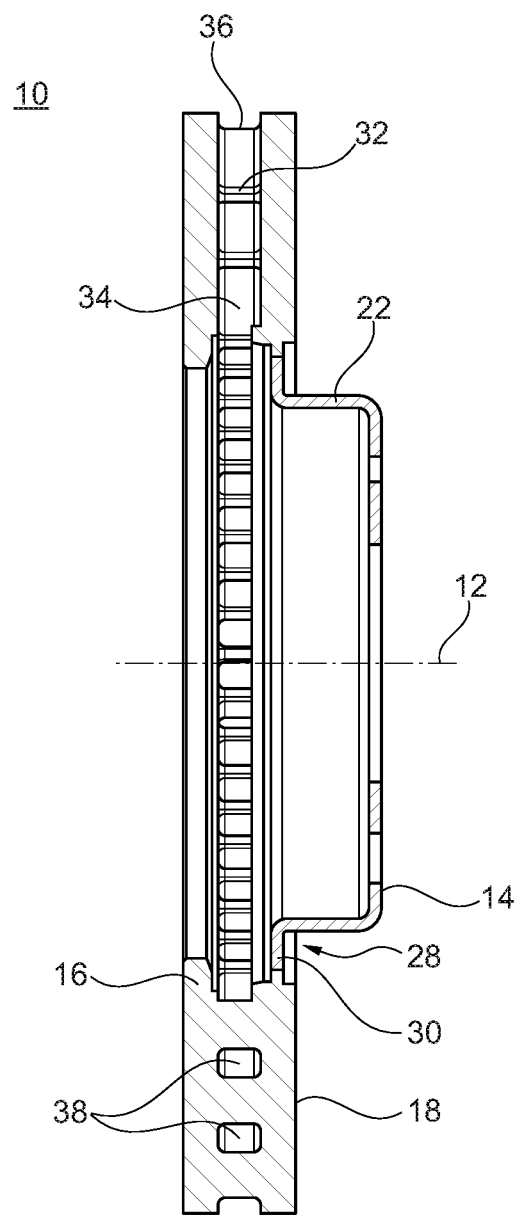
FIG. 2 shows a cross-sectional side view of the hybrid lightweight brake disk of to FIG. 1.

Shown in FIG. 2 is the hybrid lightweight brake disk 10 according to the present disclosure in a partially sectioned side view. A multiplicity of radially extending cooling passages 32 are formed inside the friction ring 16. Each of the radial cooling passages 32 has an opening 34 facing an interior of the brake chamber 14 and an opening 36 arranged on an outer circumferential line of the friction ring 16. Each of the radial cooling passages 32 forms a flow passage for the ambient air so that during a rotation of the hybrid lightweight brake disk 10 during driving operation ambient air, for example from a region close to the axle, is conducted through the radial cooling passages 32 and an efficient level of air cooling is created by internal ventilation of the friction ring 16.

As is apparent from FIG. 2, two adjacent radial cooling passages 32 are fluidically connected by means of a multiplicity of azimuthally arranged through-openings 38 which are uniformly spaced apart in the radial direction. As a result, material use for producing the friction ring 16 and the weight of the hybrid lightweight brake disk 10 can be reduced.

As is indicated in FIG. 1, the circular respectively outer circular, outer friction surface 18 of the friction ring 16 is provided with a multiplicity of grooves 20. The arrangement of such grooves 20 serves for the removal of brake dust and/or rain water from the friction surface 18.

Figure 3:
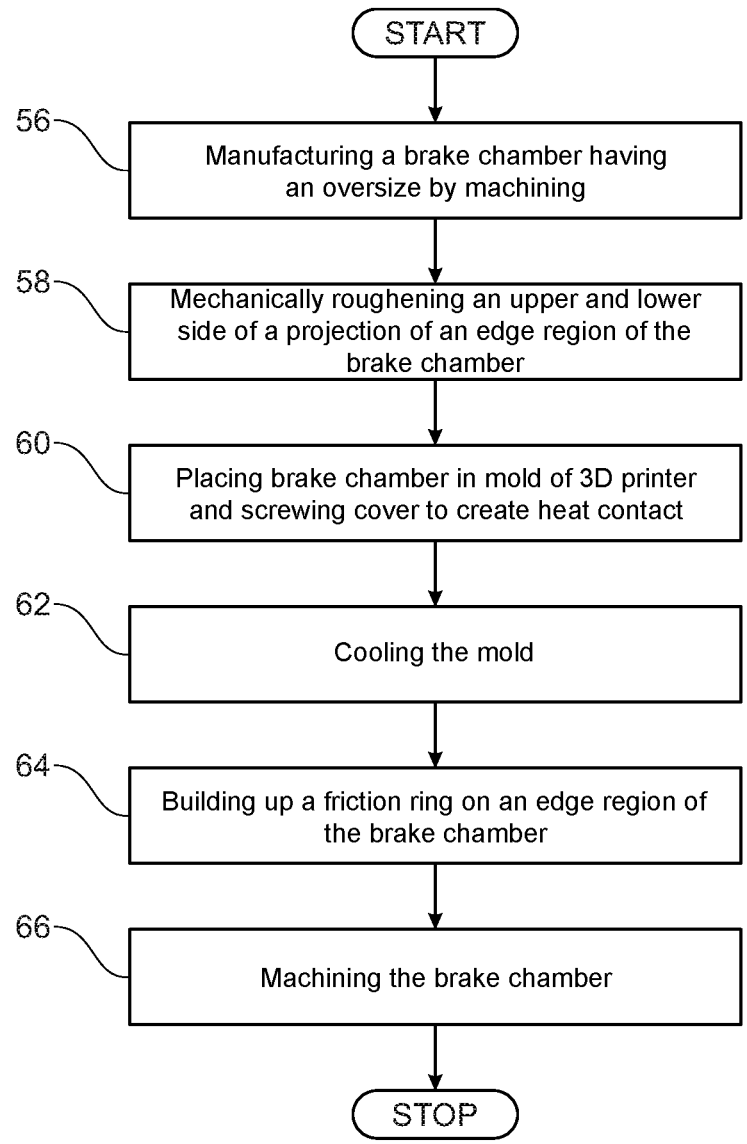
FIG. 3 shows a flow diagram of a method according to the present disclosure for producing the hybrid lightweight brake disk according to FIGS. 1 and 2.

One form according to the present disclosure of a method for producing the hybrid lightweight brake disk 10 is described below. A flow diagram of the method is shown in FIG. 3.

In a first step 56 of the method, the brake chamber 14 is manufactured in a cutting process by turning, with the described oversize, from a blank of aluminum-forged alloy EN AW-6061. In the subsequent step 58, the upper and the lower sides of the encompassing projection 30 of the edge region 28 of the brake chamber 14 are mechanically roughened, for example by diamond rolling, in order to improve a mechanical bonding of the friction ring 16 which is to be built up.

Figure 4:
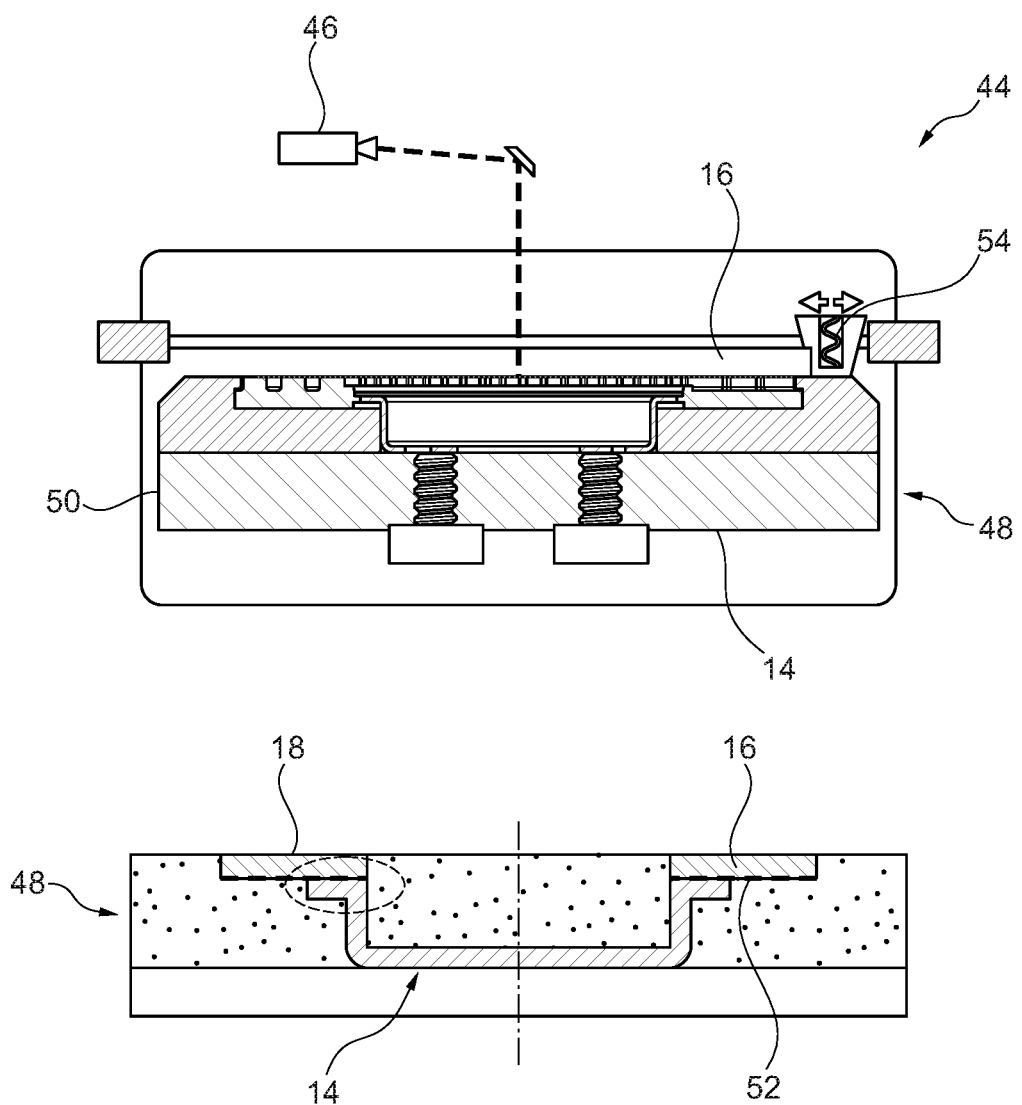
FIG. 4 shows schematic views of an arrangement of a hybrid lightweight brake disk in a 3D-printer during a building up of a friction ring.

In a next step 60, the brake chamber 14 is provided for further machining. To this end, the brake chamber 14 is laid in a mold 48 of a 3D-printer 44 (FIG. 4) in such a way that the edge region 28 of the brake chamber 14 is accessible for a planned buildup of the friction ring 16. A region of the mold 48 close to the edge region 28, together with said edge region 28 of the brake chamber 14, in this case forms a flat support surface 52 which is desired for the use of the 3D-printing process. The cover of the cylindrical part 22 of the brake chamber 14 is screwed to a good heat conductive (for example by using copper) base section 50 of the mold 48 of the 3D-printer 44 and as a result comes into mechanical contact with the base section 50, as a result of which a good heat contact is created. The good heat conductive base section 50 of the mold 48 is connected to a cooling device (not shown) and by means of a pump-delivered cooling medium can be force cooled.

In a further step 62 of the method, the forced cooling of the mold 48 of the 3D-printer is activated.

In a subsequent step 64, by using a 3D-printing process with the 3D-printer 44, which contains a laser beam source 46, the friction ring 16 is built up on the edge region 28 of the brake chamber 14. The material for building up the friction ring 16 comprises a rapidly solidified aluminum alloy, which in one form is AlSi20FeNi2 with an additive of silicon carbide, and in this specific exemplary form exists in powder 54. Used as the alloy to be built up in another exemplary form is a metal matrix composite material which contains the rapidly solidified aluminum alloy and also an additive of silicon carbide, embedded in a matrix.

When the friction ring 16 is completely built up and cooled to the normal temperature, the built up hybrid lightweight brake disk 10 is aftermachined in a cutting process in a further method step 66 by machining the brake chamber 14 by turning (FIG. 3) and brought into the finish-machined state. Machining of the friction ring 16 is not necessary and can be omitted.

Alternatively to the use of the 3D-printing process, the step 64 of building up of the friction ring 16 can be carried out by using a laser deposition welding process (laser cladding). Holding the brake chamber in a mold and cooling can similarly be provided for the 3D-printing process. For example, in a conventional laser deposition welding process the brake chamber, which is provided in the mold, can be moved back and forth under a laser beam by means of a parts manipulator, whereas with a known ring-gap powder nozzle a powder stream, focused in the form of a hollow cone, comprising powder particles of the rapidly solidified aluminum alloy is directed coaxially to the laser beam onto the brake chamber or onto an already finished part of the friction ring. A building up of the friction ring is generally carried out perpendicularly to the base. A working region between the powder nozzle and the brake chamber or the already finished part of the friction ring can, however, also be inclined by up to 30° from the perpendicular direction during the building up, as a result of which the working region is enlarged. Consequently, dissipation of heat from the working region with a smaller temperature difference can be achieved. In addition, it is possible to bevel the brake chamber on the periphery of the edge region so that the cross-sectional area of a heat transfer from the working region to the cooled brake chamber is increased, as a result of which the heat dissipation is improved.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for producing a hybrid lightweight brake disk, the method comprising:
   providing a brake chamber made from a material comprising an aluminum-forged alloy; and
   building up a friction ring from a rapidly solidified aluminum alloy on an edge region of the brake chamber by using an additive production process; and
   forced cooling the brake chamber during the building up of the friction ring by forced cooling a mold to which the brake chamber is attached.

2. The method as claimed in claim 1, wherein the additive production process is a laser deposition welding process.

3. The method as claimed in claim 1, wherein the step of building up the friction ring includes deposition of the rapidly solidified aluminum alloy from a powder form.

4. The method as claimed in claim 1, wherein the step of building up the friction ring comprises a directed deposition of the rapidly solidified aluminum alloy in a direction perpendicular to the brake chamber and forms an angle different from zero.

5. The method as claimed in claim 4, wherein the angle of the directed deposition is between 10° to 30°.

6. The method as claimed in claim 1, wherein the rapidly solidified aluminum alloy contains an additive of silicon carbide.

7. The method as claimed in claim 1, wherein a metal matrix-composite material containing the rapidly solidified aluminum alloy is used as the aluminum alloy to be built up, wherein a 3D-printing process is used to build up the friction ring.

8. The method as claimed in claim 1 further comprising the step of afterworking of the built up hybrid lightweight brake disk by machining the brake chamber and omitting a machining of the friction ring.

9. The method as claimed in claim 1 further comprising the step of diamond rolling at least one part of the edge region of the brake chamber.

* * * * *